United States Patent
Cofino et al.

(10) Patent No.: US 8,515,959 B2
(45) Date of Patent: Aug. 20, 2013

(54) METHOD AND APPARATUS FOR MAINTAINING AND NAVIGATING A NON-HIERARCHICAL PERSONAL SPATIAL FILE SYSTEM

(75) Inventors: Thomas A. Cofino, Rye, NY (US); Jonathan Lenchner, North Salem, NY (US)

(73) Assignee: International Business Machines Corporation, Armonk, NY (US)

(*) Notice: Subject to any disclaimer, the term of this patent is extended or adjusted under 35 U.S.C. 154(b) by 1491 days.

(21) Appl. No.: 11/113,457

(22) Filed: Apr. 25, 2005

(65) Prior Publication Data

US 2005/0187931 A1    Aug. 25, 2005

Related U.S. Application Data

(62) Division of application No. 09/707,004, filed on Nov. 6, 2000, now abandoned.

(51) Int. Cl.
*G06F 7/00* (2006.01)
*G06F 17/30* (2006.01)

(52) U.S. Cl.
USPC .......................................................... 707/739

(58) Field of Classification Search
USPC .......................................... 707/739, 999.205
See application file for complete search history.

(56) References Cited

U.S. PATENT DOCUMENTS

| | | | |
|---|---|---|---|
| 5,418,951 A | 5/1995 | Damashek | |
| 5,619,709 A | 4/1997 | Caid et al. | |
| 5,742,816 A * | 4/1998 | Barr et al. | 707/3 |
| 5,754,939 A | 5/1998 | Herz et al. | |
| 5,857,189 A | 1/1999 | Riddle | |
| 5,941,944 A | 8/1999 | Messerly | |
| 6,026,398 A | 2/2000 | Brown et al. | |
| RE36,727 E | 6/2000 | Kageneck et al. | |
| 6,084,858 A | 7/2000 | Matthews et al. | |
| 6,097,726 A | 8/2000 | Puntambekar et al. | |
| 6,263,334 B1 | 7/2001 | Fayyad et al. | |
| 6,298,174 B1 | 10/2001 | Lantrip et al. | |
| 6,327,590 B1 | 12/2001 | Chidlovskii et al. | |
| 6,356,864 B1 | 3/2002 | Foltz et al. | |

(Continued)

OTHER PUBLICATIONS

Schutze et al., "Projections for Efficient Document Clustering," Annual ACM Conference on Research and Development in Information Retrieval, Jan. 1, 1997, 74-81.*

(Continued)

*Primary Examiner* — Aleksandr Kerzhner
(74) *Attorney, Agent, or Firm* — Ryan, Mason & Lewis, LLP (57) ABSTRACT

A self-organizing personal file system is disclosed that evaluates the "importance" of terms and phrases in a document in a personal corpus relative to usage in a reference corpus. A personalized term weighting scheme assigns a weight to terms or phrases based on the frequency of occurrence of the corresponding term or phrase in a reference corpus. The personalized term weighting for a given term or phrase can be used to store and access documents containing the corresponding term or phrase in the spatial file system and provides coordinates in a spatial file system, for one or more documents containing the corresponding term or phrase. The location of a given document in a file space may be specified by the relative frequency distribution of the stems of its significant terms or phrases compared to the occurrence of such terms or phrases in a reference corpus.

16 Claims, 6 Drawing Sheets

(56) References Cited

U.S. PATENT DOCUMENTS

| | | | |
|---|---|---|---|
| 6,424,971 | B1 | 7/2002 | Kreulen et al. |
| 6,473,753 | B1 * | 10/2002 | Katariya et al. ............... 1/1 |
| 6,473,816 | B1 * | 10/2002 | Yoshida et al. ............ 710/113 |
| 6,490,577 | B1 | 12/2002 | Anwar |
| 6,502,081 | B1 | 12/2002 | Wiltshire et al. |
| 6,510,406 | B1 | 1/2003 | Marchisio |
| 6,549,897 | B1 | 4/2003 | Katariya |
| 6,567,797 | B1 | 5/2003 | Schuetze |
| 6,567,810 | B1 | 5/2003 | Singhal |

OTHER PUBLICATIONS

Voorhees, "The Efficiency of Inverted Index and Cluster Searches," SIGIR'86, Proceedings of the 9th Annual International ACM SIGIR Conference on Research and Development in Information Retrieval, Pisa, Italy, Sep. 8-10, 1986, 164-174.*

Deerwester et al "Indexing by Latent Semantic Analysis," Journal of the American Society for Information Science, vol. 41, No. 6, 391-407 (1990).

Fairchild et al , "SemNet: Three-Dimensional Graphic Representations of Large Knowledge Bases" Cognitive Science and its Application for Humans—Computer Interaction. 190-206 (1988).

Hendley et al, , "Case Study, Narcissus: Visualizing Information," Proc IEEE Information Visualization, 503-509 (1995).

Jiang et al., "Approximate Dimension Equalization in Vector-based Information Retrieval" Department of Computer Science, Duke University, (2000).

Franz, et al. "Ad hoc and multilingual Information Retreival at IBM," Proceedings of the Seventh Text Retrieval Conference, 1999, 157-168.

Teuvo Kohonen, "The Self-Organizing Map," Proceedings of the IEEE, V 78, 1464-1480 (1990).

Wise et al., "Visualizing the Non-Visual: Spatial Analysis and Interaction with Information from Text Documents," Proc. IEEE Information visualization, 442-439 (1995).

Xia Lin, "Visualization for the Document Space," Center for Computerized Legal Research, Pace University 432-439 (1992).

Salton, et al. "Term-Weighting Approaches in Automatic Text Retreival." Information and Processing Management, vol. 25(5):513-523 1988.

Robertson, et al "Okapi at TREC-3." The Third Text Retrieval Conference, National Institute of Standards and Technology Special Publication, 1995.

Jiang, at al "Approximate Dimension Equalization in Vector-based Information Retrieval." Proceedings of the Seventeenth International Conference on Machine Learning, Morgan Kaufman 2000.

Johnson et al., "Classification and Grouping Techniques," Applied Multivariate Statistical Analysis, 560-578 (1982).

* cited by examiner

METHOD AND APPARATUS FOR MAINTAINING AND NAVIGATING A NON-HIERARCHICAL PERSONAL SPATIAL FILE SYSTEM

CROSS-REFERENCE TO RELATED APPLICATION

This application is a divisional application of U.S. patent application Ser. No. 09/707,004 filed Nov. 6, 2000, now abandoned incorporated by reference herein.

FIELD OF THE INVENTION

The present invention relates generally to the field of computer file system management and, more specifically, to the field of computer file system management of documents.

BACKGROUND OF THE INVENTION

A number of well-known techniques exist for organizing and visualizing documents in a file system. For example, a number of organization and visualization techniques are described in Readings in Information Visualization: Using Vision to Think, edited by Stuart K. Card et al., Morgan Kaufman Publishers, Inc., San Fransisco, Calif. (1999). For example, Wise et al., "Visualizing the Non-Visual: Spatial Analysis and Interaction with Information from Text Documents" (441-450), Proceedings of IEEE Information Visualization '95, 51-58 (1995), discuss various attempts to visualize large quantities of textual information, most importantly the "Galaxies" visualization which "displays cluster and document inter-relatedness by reducing a high dimensional representation of documents and clusters to a 2D scatter plot of 'docupoints' that appear as do stars in the night sky." Hendley et al., "Case Study: Narcissus: Visualizing Information" (503-509), Proceedings of IEEE Information Visualization '95, 90-96 (1995), discusses a representation of a three-dimensional information space that is self-organizing. Points, such as web pages, exert a repulsive force from one another that is proportional to their dissimilarity, eventually reaching a steady state.

Typically, files are maintained in a file system that uses a hierarchical structure. While such hierarchical structures provide an effective mechanism for organizing files in the file system, they suffer from a number of limitations, which if overcome, could signficantly increase the efficiency and consistency of file systems. Specifically, such hierarchical structures must rely on the computer user(s) to maintain the hierarchy. Thus, a number of self-organizing techniques have been disclosed or suggested for organizing file systems. For example, associative memory techniques have been applied in file systems. An associative memory relies more on associated recollections to pick out a particular memory than on absolute memory locations. See, for example, T. Kohonen, Self-Organization and Associative Memory, Springer-Verlag, New York, 1987 and T. Kohonen, "The self-organizing map," Proceedings of the IEEE, 78(9), 1990: 1464-1480, each incorporated by reference herein. Kohonen's self-organizing feature map algorithm addresses the problem of preserving the relative distances among points when doing a dimensionality reduction from N>2 dimensions to two. For example in three dimensions, it is possible to have four points which are equidistant from one another (i.e., the vertices of a regular tetrahedron), but it is not possible to preserve this equidistance relationship when projecting these points to a plane since on a plane, at most three points can be equidistant.

Addressing this problem, Kohonen came up with an algorithm for representing higher dimensional objects in two dimensions, by considering them as collections of grid points, all enclosed by a convex region not containing any other grid points. The distance between higher dimension points when interpreted in this kind of two dimensional "projection" is equal to the distance between closest grid points. These Kohonen feature maps do a better job of preserving relative distance then do standard projections. Dimensionality reduction is important in rendering a navigation system through a high dimension document space.

A number of information retrieval mechanisms exist for accessing information based on a semantic analysis of documents. For example, vector space methods in information retrieval identify relevant documents by determining a similarity between two documents. The most important vector space information retrieval models include the Vector Space Method (VSM), the Generalized Vector Space Method (GVSM), described in S. Wong et al., "Generalized Vector Space Model in Information Retrieval," ACM SIGIR Conference on Research and Development of Information Retrieval 1985: 18-25, and the method of Latent Semantic Indexing (LSI), described in S. Deerwester et al., "Indexing by Latent Semantic Analysis," Journal of the American Society for Information Science 1990 41(6): 391-407.

Generally, the VSM information retrieval model looks at a document as a vector of frequencies of words, where the similarity between two documents, d and d', is the vector dot product. The GVSM information retrieval model tries to solve the problem in VSM where virtually synonymous words are treated as orthogonal. GVSM uses a training collection of documents, or training matrix to "condition" the dot product. In VSM, single word documents will have a non-zero similarity if they differ. In GVSM, single word documents will have a similarity equal to how well the words are correlated to one another in the training documents. The LSI information retrieval model goes in a different direction, trying to get at the problem of polysemy, where words can have different meanings, but in comparing word frequencies in documents analogous meanings of the same words are removed. Aside from this, LSI is a very useful technique for determining principal components for dimensionality reduction.

Vector space methods use either word frequencies, normalized word frequencies, or some other term weighting scheme to coordinatize documents within the vector space. The most popular term weighting schemes are based on the term-frequency (tf) multiplied by the inverse document frequency (idf), often referred to as "tf×idf." See, for example, G. Salton and C. Buckley, "Term-Weighting Approaches in Automatic Text Retrieval," Information Processing & Management 1988 24(5): 513-523 and S. Robertson, et al, "Okapi at TREC-3," The Third Text Retrieval Conference, National Institute of Standards and Technology Special Publication, 1995: 500-525.

The most traditional tf×idf term weighting is $f*\log(N/n)$, where f is the frequency of the word in the current document, N is the total documents in the local corpus, and n is the number of documents in the local corpus containing the word. Once these weights are determined, they are normalized to ensure document vectors of length one (1). Normalization allows distance between documents to be viewed as the angle between document vectors, and the cosine of the angle is then a measure of the similarity between the vectors, which may be computed by taking the coordinate by coordinate dot product. Many other forms of tf×idf have been proposed, some of which do not use normalization. In any case, the key to tf×idf term weighting is the idf term. If a document is viewed purely as a vector of word counts, then very commonly occurring words would dominate, and documents could be seen to be close if they use commonly occurring words, such as "and" and "the," in similar numbers. The inverse document frequency solves this problem by giving such words a very low idf. Since words such as "and" and "the" will occur in virtually every document, the N/n in the tfxidf term weighting computation will be close to one and the log of N/n will be close to 0. Thus, these commonly occurring words will have negligible term weights.

LSI and other vector space methods use only a single corpus when coordinating documents within the vector space using term weighting schemes. The use of LSI in conjunction with standard term-weighting schemes enables the most discriminable terms or phrases to rise to the top of the decomposition, as the principal right singular vectors. However, with a single corpus it is not possible to distinguish the discriminable terms, phrases and concepts from the "important" terms, phrases and concepts. In particular, such single corpus term weighting schemes do not evaluate "importance" from a personal standpoint. The indistinguishability between importance and discriminability is borne out in an article by F. Jian and M. Littman entitled "Approximate Dimension Equalization in Vector-based Information Retrieval," Proceedings of the Seventeenth International Conference on Machine Learning, Morgan Kaufman, 2000: 423-430. Jian and Littman provide theoretical and experimental evidence to show that the dimensions that remain after an LSI-based dimension reduction should be weighted uniformly. In fact, they show how GVSM, because of its effective weighting, acts like a severely dimensionally reduced version of LSI, and so consistently under-performs LSI in retrieval tasks. Thus, with single corpus tfxidf term weighting schemes, the first few singular vectors should thus not be viewed as the most "important" in any sense of the word.

Existing single-corpus information retrieval methods do not allow the concept of "importance" to be assessed from the vantage point of a given individual, or otherwise. For example, suppose an artificial intelligence researcher has a number of documents that use the terms "artificial" and "intelligence." Examination of the researcher's own documents does not permit an assessment of the importance of these terms for the researcher. It could, in fact, be that these terms are simply very commonly used.

Therefore, a need exists for an improved self-organizing personal file (and navigational) system. A further need exists for a file management system which requires minimal user involvement for organization. In a landscape of pervasive computing devices, for example, with information coming at users from all directions, much of which a user would like to save within his or her personal collection, it is not practical to have to save every document within a personally created hierarchy. Yet another need exists for a computer filing system that is highly interactive, and gives the user a navigational space, with landmarks to get his/her bearings within the search space, along with improved search facilities based on the underlying semantics of documents. An object of this invention is to provide an improved method for determining the relevance of a document to a query, or proximity of one document to another based on two-corpus, relative term weighting. An additional object of this invention is to provide the user with a rich spatial representation of files, that is highly interactive and optimized for efficient navigation.

SUMMARY OF THE INVENTION

Generally, a self-organizing personal file system is disclosed. The disclosed personal file system evaluates the "importance" of terms and phrases in a document in a personal corpus relative to usage in one or more larger, reference corpuses. As used herein, the expression "term," such as a "term in a document," shall include a word, a word stem, the root of a word, or a sequential group of words, word stems or roots of words. According to one aspect of the invention, terms or phrases in a document are weighted in accordance with a personalized term weighting scheme. Generally, the personalized term weighting scheme assigns a weight to terms or phrases based on the frequency of occurrence of the corresponding term or phrase in a reference corpus.

According to another aspect of the invention, the personalized term weighting for a given term or phrase can be used to store and access documents containing the corresponding term or phrase in the spatial file system. Generally, the personalized term weights provide coordinates in a spatial file system, for one or more documents containing the corresponding term or phrase. More specifically, the location of a given document in a file space may be specified by the relative frequency distribution of the stems of its significant terms or phrases compared to the occurrence of such terms or phrases in a reference corpus. Thus, documents containing similar subject matter (and using similar terminology) will be in the same vicinity, that is, have similar coordinates, in the spatial file system.

In one exemplary implementation, the employed term weighting scheme is based on the fractional frequency of a term in a user's document divided by the fractional frequency of the term in the reference corpus. It is noted, however, that alternative term weighting schemes can be employed in accordance with the present invention, such as entropy weightings and traditional tfxidf weightings, provided they utilize a reference corpus. The fractional frequency of a term in the document is the number of occurrences of the term in the document divided by the total number of words in the document. The fractional frequency of the term in the reference corpus is the number of occurrences of the term in the reference corpus divided by the total number of words in the reference corpus.

According to another aspect of the invention, the personalized term weighting scheme inherently discounts commonly occurring words. In the vector of term weightings for documents using this relative fractional frequency calculation, the words that dominate are those that are used hundreds or thousands of times or more frequently than "background" (i.e., relative to usage in the reference corpus). Thus, when the Euclidean distance computation is performed, for example, during coordinatization for an information retrieval (IR) task, the important terms will be those terms that are used significantly more often than they are used in the reference corpus. The distance computation is the square root of the sum of the squares of the coordinate-wise differences. Thus, commonly occurring terms will naturally be discounted and the relevant documents to the user-specified keywords will be those documents having the smallest distance (i.e., are closest to the user-specified terms).

A spatial rendering system is also disclosed that utilizes the personalized term weights as coordinates for each document in a spatial file system. Thus, the location of a given document in a file space may be specified by the relative frequency distribution of the stems of its significant terms or phrases compared to the occurrence of such terms or phrases in the reference corpus. A singular value decomposition is performed based on the term weights to position a given document in the visual file space based on a relative frequency distribution of terms of said document compared to the occurrence of such terms in a reference corpus. The spatial rendering system positions landmarks in the visual file space in accordance with a degree of correlation with each file system axis indicating terms that are correlated to terms associated with axes of the file system. The disclosed spatial rendering system can also render additional orthogonal axes.

A more complete understanding of the present invention, as well as further features and advantages of the present invention, will be obtained by reference to the following detailed description and drawings.

DETAILED DESCRIPTION OF EMBODIMENTS

Figure 1:
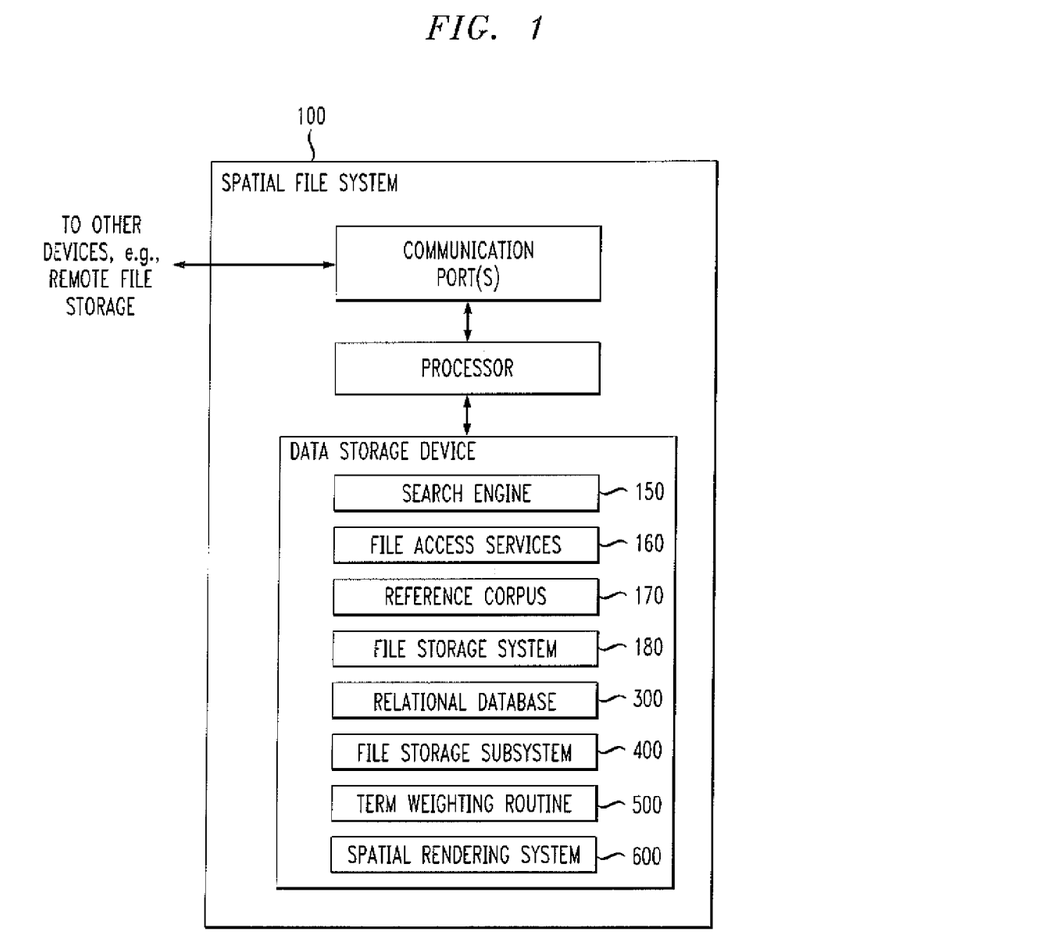
FIG. 1 is a schematic block diagram showing the architecture of an illustrative spatial file system in accordance with the present invention.

The present invention provides a spatial file system 100, shown in FIG. 1, that maintains files as points in a dimension space. FIG. 1 is a schematic block diagram of an embodiment of the spatial file system 100 of the present invention. As shown in FIG. 1, the spatial file system 100 includes a search engine 150, file access services 160, a reference corpus 170 and a file storage system 180. Generally, the file storage system 180 allows files to be accessed sequentially beginning at the first byte using, for example, a read command. In addition, as discussed further below in conjunction with FIGS. 2 and 3, the spatial file system 100 includes one or more relational database(s) 200, 300, though the relational database can be replaced by a large, in-memory, inverted index, using the same architecture, to improve performance. The file storage system 180 and relational databases 200, 300 may be local or remote, and they may be integrated with the spatial file system 100 (as shown) or embodied as stand-alone devices. The spatial file system 100 also includes a file storage subsystem 400 and a term weighting routine 500, discussed further below in conjunction with FIGS. 4 and 5, respectively. Finally, a representative spatial rendering system 600 is discussed further below in conjunction with FIG. 6.

Relational Databases

Figure 2:
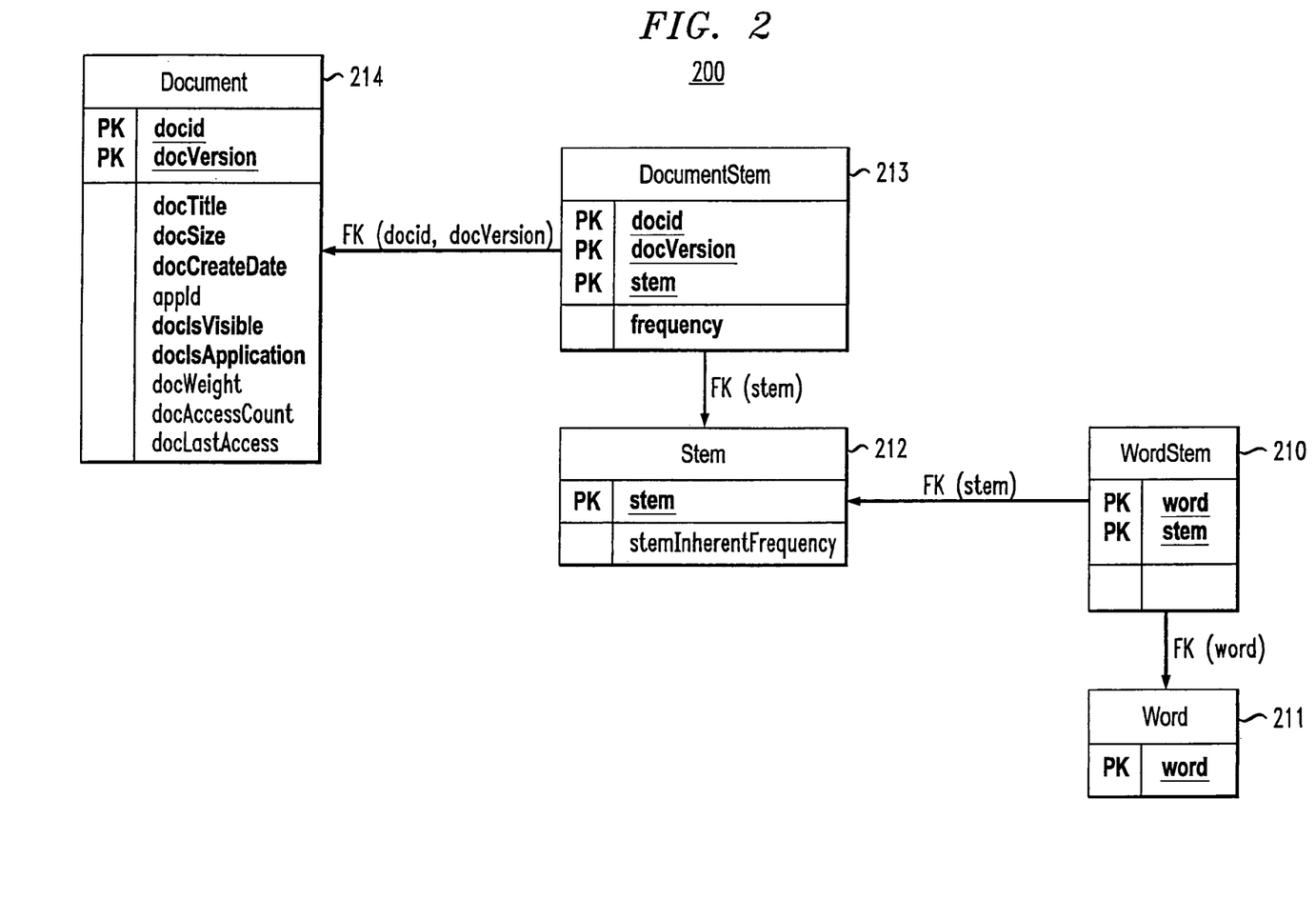
FIGS. 2 and 3 illustrate the relational databases of FIG. 1 that are comprised of a number of related data structures that are utilized to store and access documents in terms of word or phrase stems, respectively, in accordance with the present invention.
Figure 3:
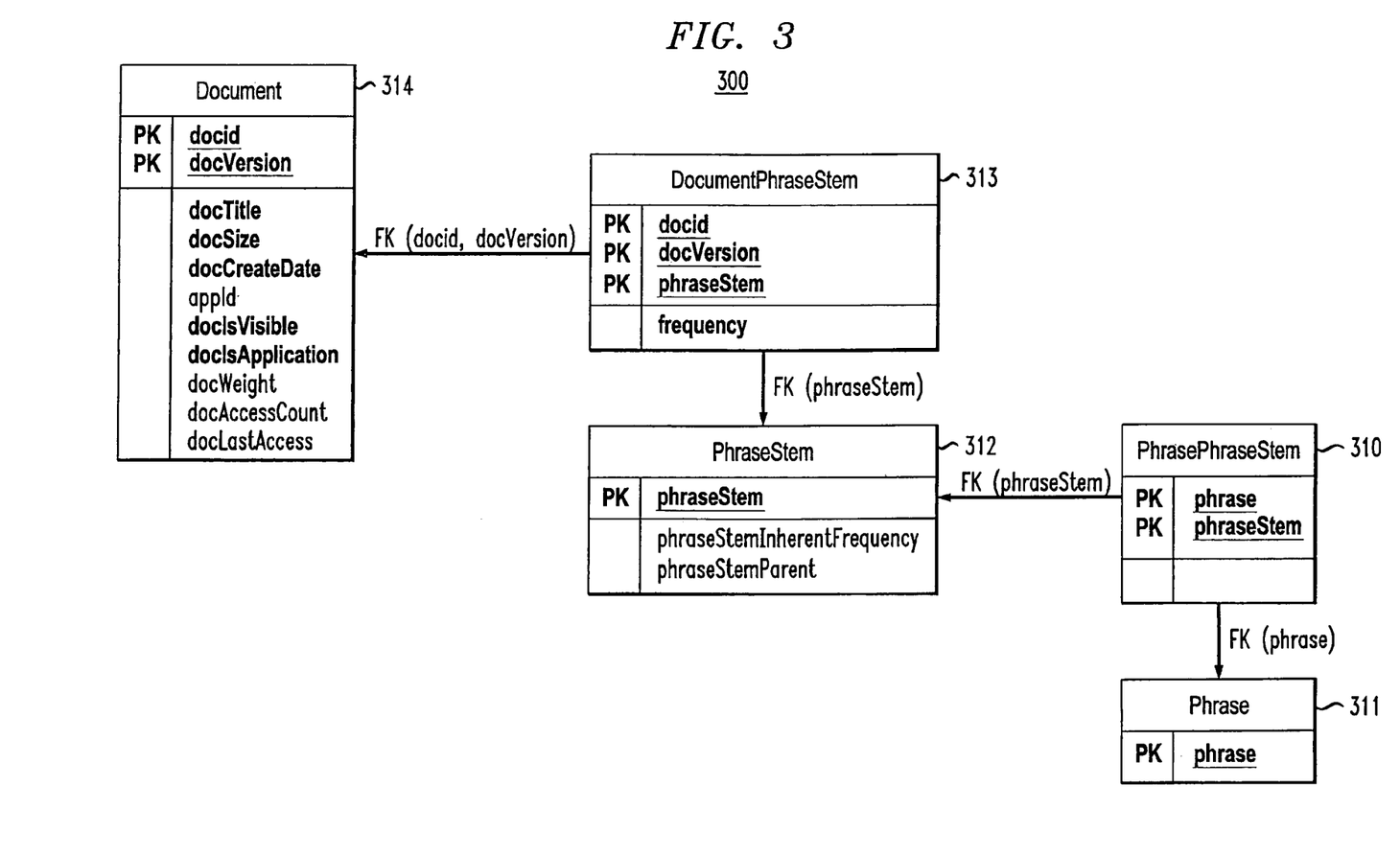

FIG. 2 illustrates a relational database 200 comprised of a number of related data structures 210-214 that are utilized to store and access documents in terms of word stems in accordance with the present invention. The various data structures 210-214 are interrelated using a number of primary keys (PK) and foreign keys (FK). Arrows for foreign key relationships point from the structure with the foreign key to the structure with the primary key. FIG. 3 illustrates an alternate implementation of a relational database 300 where documents are stored and accessed in terms of phrases (multiple words) and phrase stems (multiple word stems), along with parent-child relationship amongst phrases. Similar to the relational database 200 of FIG. 2, the various data structures 310-314 are interrelated using a number of primary keys and foreign keys.

As shown in FIG. 2, the relational database 200 includes a WordStem structure 210, a Word structure 211, a Stem structure 212, a DocumentStem structure 213 and a Document structure 214. Generally, the WordStem structure 210 associates each word having an associated Word structure 211 and its corresponding stem having an associated Stem structure 212. To discount for the frequency of commonly occurring roots, the Stem structure 212 contains a column called stemInherentFrequency which has the naturally occurring frequency of the stem in a very large reference corpus, such as the corpus 170 (FIG. 1). To accommodate the problem of new terms or acronyms being coined as time goes on, the user's own documents can be used to augment the reference collection. The additional counter columns needed to maintain these frequencies are omitted from the illustrative data model shown in FIG. 2.

In addition, the DocumentStem structure 213 associates each stem (having an associated Stem structure 212) and the corresponding documents in which the stem appears, as indicated in the Document structure 214. The DocumentStem structure 213 identifies the stem, and the corresponding document (docID/docVersion), and also provides a frequency count indicating the number of times the stem appears in the document.

A Document structure 214 exists for each document in the personal corpus of a user. In addition to providing the document identifier and version (docID/docVersion), the Document structure 214 provides the title, size, creation date and corresponding application associated with the document.

It is noted that the spatial file system 100 generally treats every kind of file as a document, including applications (any executable file), utility files, image files, audio files, and electronic mail documents. Thus, the Document structure 214 provides a docIsVisible field that can be set to "false" in order to permit some files to be inaccessible during routine navigation. The docIsApplication field can be set to "true" when the document corresponds to an application file. It is noted, however, that all documents will be coordinatized. In other words, all documents will have corresponding values in the DocumentStem (FIG. 2) or DocumentPhraseStem (FIG. 3) tables. For documents without textual content, typically only the titles will be used for coordinatization (docTitle).

Figure 7:
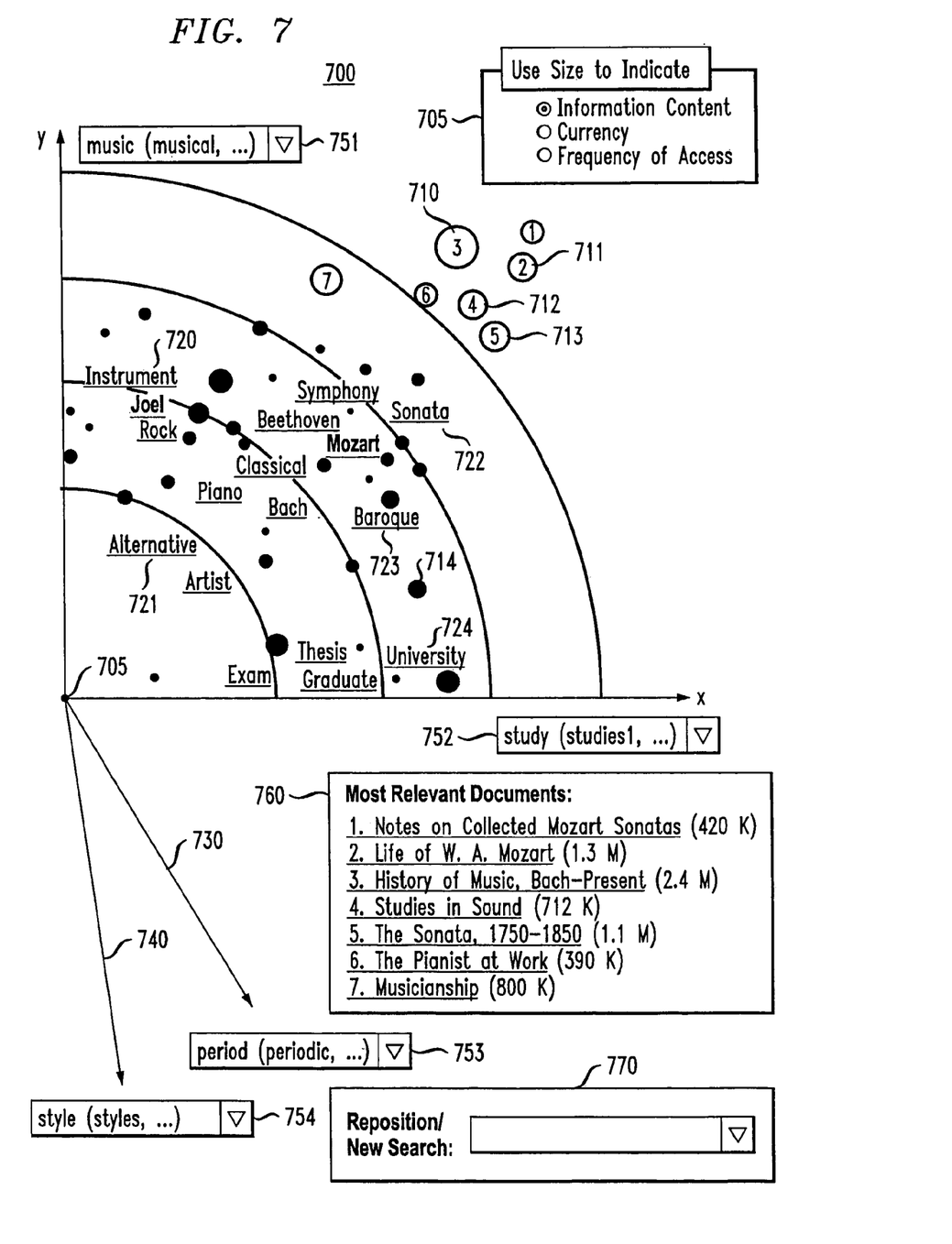
FIG. 7 depicts a representative two-dimensional starfield-like snapshot of a user navigation of a file space in accordance with the present invention.

The docWeight entry in the Document structure 214 indicates the overall weight assigned to the document. The docWeight is calculated, for example, when the document is stored, as discussed further below in a section entitled File Storage Subsystem. Finally, the docAccessCount and docLastAccess fields in the Document structure 214 provide access-related administrative information, or meta-deta. Files may be accessed by content, meta-data, or a combination of these, as depicted in FIG. 7.

As previously indicated, FIG. 3 illustrates an alternate implementation of a relational database 300 where a document's semantics are stored and accessed in terms of phrases (multiple words) and phrase stems (multiple word stems). Phrase stems are derived from word stems by taking the stems of the constituents of component words. Documents are scanned for two to N word sequences that contain at least two significant stems. Frequencies are calculated by taking the number of occurrences of the phrase stem divided by the total number of sequences of the given length in the document.

Thus, if a document contained 1000 words, and a phrase stem was "artificial intelligence," and there were three occurrences in the given document, then the observed frequency would be (3/999), since there are 999 two word sequences in a 1000 word document (actually less, since occurrences would not be allowed to carry across sentence boundaries).

While the illustration of the relational databases 200, 300 shown in FIGS. 2 and 3 are simplified to assume use of a single language, the relational databases 200, 300 can be extended to accommodate a plurality of languages, as would be readily apparent to a person of ordinary skill in the art. For a discussion of extensions of various vector space methods to multi-lingual corpuses, see, for example, M. Franz et al., "Ad Hoc and Multilingual Information Retrieval at IBM," Proceedings of the Seventh Text Retrieval Conference (157-168) (1999); Dept. Of Commerce, National Institute of Commerce, National Institute of Standards and Technology and T. K. Landauer, and M. L. Littman, "Fully Automatic Cross-Language Document Retrieval Using Latent Semantic Indexing," Proceedings of the Sixth Annual Conference of the UW Centre for the New Oxford Dictionary and Text Research (31-38), Waterloo, Ontario (1990). In addition, the relational databases 200, 300 may be embodied as inverted indexes in an alternate implementation.

File Storage Subsystem

Figure 4:
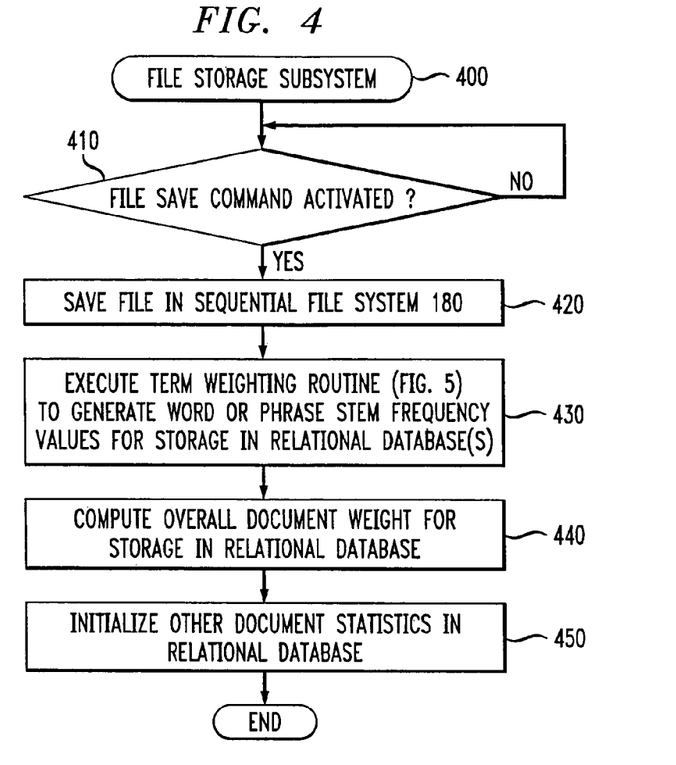
FIG. 4 is a flow chart describing an exemplary file storage subsystem of FIG. 1.

FIG. 4 is a flow chart describing an exemplary file storage subsystem 400 incorporating features of the present invention. As shown in FIG. 4, the file storage subsystem 400 is initiated during step 410 upon activation of a file save dialog (or another user command) that allows the user to save the file by name. Optionally, clients of the file save dialog may ask their users to provide keywords to assist in retrieving the document. This option will typically only be used if the file being saved is a non-text document.

Once initiated, the file storage subsystem 400 performs a number of tasks, which may be performed serially, substantially in parallel, or a combination of the foregoing. During step 420, the file is saved in the sequential file system 180. It is noted that the file storage subsystem 400 optionally provides an application programming interface (API) for saving the word or phrase-stem frequency distributions within the relational database 200, 300. The use of an API for storage in the sequential file system 180 allows the document to be optionally stored in a proprietary format, which need not be understood by the file storage subsystem 400.

The file storage subsystem 400 executes a term weighting routine 500, discussed below in conjunction with FIG. 5, during step 430 to generate the word or phrase stem frequency values for storage in the relational database 200, 300. Thereafter, the overall document weight is computed during step 440 for storage in the relational database 200, 300. The overall document weight indicates the total information content of the document, and is the sum of the term weights for all terms (or phrases) in the document. Finally, during step 450, the file storage subsystem 400 initializes other document statistics, such as the access parameters for storage in the docAccessCount and docLastAccess fields in the Document structure 214, 314 of the relational database(s) 200, 300.

Personalized Term Weighting Scheme

Figure 5:
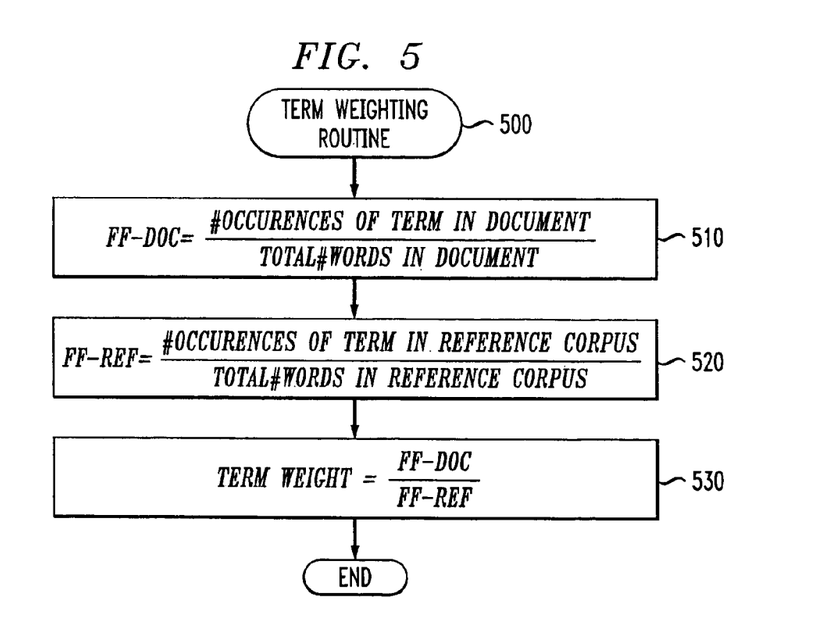
FIG. 5 is a flow chart describing an exemplary implementation of the term weighting routine executed by the file storage subsystem of FIG. 4.

As previously indicated, the file storage subsystem 400 executes a term weighting routine 500, shown in FIG. 5, to generate the word or phase stem frequency values for storage in the relational database 200, 300. FIG. 5 is a flow chart describing an exemplary implementation of the term weighting routine 500 incorporating features of the present invention. Generally, the term weighting routine 500 weights terms or phrases in a document in accordance with the personalized term weighting scheme. The exemplary term weighting scheme employed in the routine 500 is based on the fractional frequency of a term in the document divided by the fractional frequency of the term in the reference corpus 170. It is noted, however, that alternative term weighting schemes can be employed in accordance with the present invention, such as entropy weightings and traditional tf×idf weightings, provided they utilize a reference corpus, as would be apparent to a person of ordinary skill in the art.

As shown in FIG. 5, the term weighting routine 500 initially determines the fractional frequency of a term in the document (FF-DOC) during step 510 by counting the number of occurrences of the term in the document divided by the total number of words in the document.

Thereafter, the term weighting routine 500 determines the fractional frequency of the term in the reference corpus (FF-REF) during step 520 by counting the number of occurrences of the term in the reference corpus 170 divided by the total number of words in the reference corpus 170.

Finally, the term weighting routine 500 calculates the term weight for the given term during step 530 by dividing the fractional frequency of a term in the document by the fractional frequency of the term in the reference corpus.

For example, if a word occurs in a particular document from the personal corpus of a user, with a fractional frequency of a term in the document of 0.005 and a fractional frequency of a term in the large reference corpus of 0.0001, then the term weight (percentage of background) is 50.

According to another feature of the present invention, the personalized term weighting scheme inherently discounts commonly occurring words, such as "and" and "the." In the vector of term weightings for documents using this relative fractional frequency calculation, the words that dominate are those that are used hundreds or thousands of times or more frequently than "background" (i.e., relative to usage in the reference corpus 170). If a document talks about "artificial intelligence," the chances are that the words "artificial" and "intelligence" will be used thousands of times more often than background. The commonly occurring words, such as "the" and "and" in the vector of term weights based on this weighting scheme will be somewhere in the range of 0.1 to 10.

When the Euclidean distance computation is performed, for example, during coordinatization for an information retrieval task, the important terms will be those terms that are used significantly more often than they are used in the reference corpus 170. The distance computation is the square root of the sum of the squares of the coordinate-wise differences. Thus, commonly occurring terms will naturally be discounted and the relevant documents to the user-specified keywords will be those documents having the smallest distance (i.e., are closest to the user-specified terms).

In addition, the personalized term weighting scheme allows a low dimensional Singular Value Decomposition to perform better than other term-weightings using only a single corpus. It is noted that the personalized term weighting scheme may alternately be considered as:

> Fractional Frequency in Document/Fractional Frequency in Local Corpus×Fractional Frequency in Local Corpus/Fractional Frequency in Reference Corpus Without the ability to appeal to a reference corpus, we would be left with a term weighting scheme consisting of just the first term. In certain limiting circumstances (i.e., treating single paragraphs, or better, single sentences, as documents) this term weighting will converge to traditional tf×idf. However, the key is that all a Singular Value Decomposition will achieve when using such weightings is the filtering of "signal" from "noise." The singular vectors corresponding to the largest singular values will tend to contain the most signal, or semantic content, and conversely for the singular vectors corresponding to the smallest singular values. However, it is not possible to say that these vectors correspond, in any meaningful way, to the most "important" words or concepts. Knowing nothing more, these documents could be a complete set of documents from all speakers of the given language. These first few singular values will in some sense be the "crispest" concepts. However, the only way to make an assessment of "importance" is by incorporating a reference corpus. "Importance" only has meaning in terms of the importance to some person, or owner of a corpus (i.e., a work group) in comparison with everyone else. If we have a set of documents that represent our local usage, and compare term usage in the local corpus to term usage in a much larger, more representative corpus, the resultant term weightings indicate the relative importance of words. Hence, the second term in the expanded form of our term weighting formula.

Spatial Rendering System

As previously indicated, the personalized term weights provide coordinates for each document in a spatial file system 700, shown in FIG. 7. More specifically, the location of a given document in a file space may be specified by the relative frequency distribution of the stems of its significant terms or phrases compared to the occurrence of such terms or phrases in the reference corpus 170. In one illustrative implementation, frequency profiles used to coordinatize documents will be calculated as multiples of background frequencies. For example, suppose that a document contains the words system, design, and analysis and that the background frequency (FF-REF) of these (stem) words is (0.01, 0.005, 0.004) but in the current document, the observed occurrences (FF-DOC) are with frequencies (0.03, 0.01, 0.04). Thus, the corresponding coordinatization is then (3, 2, 10). It is clear that such a coordinatization does not lend itself to normalization.

Figure 6:
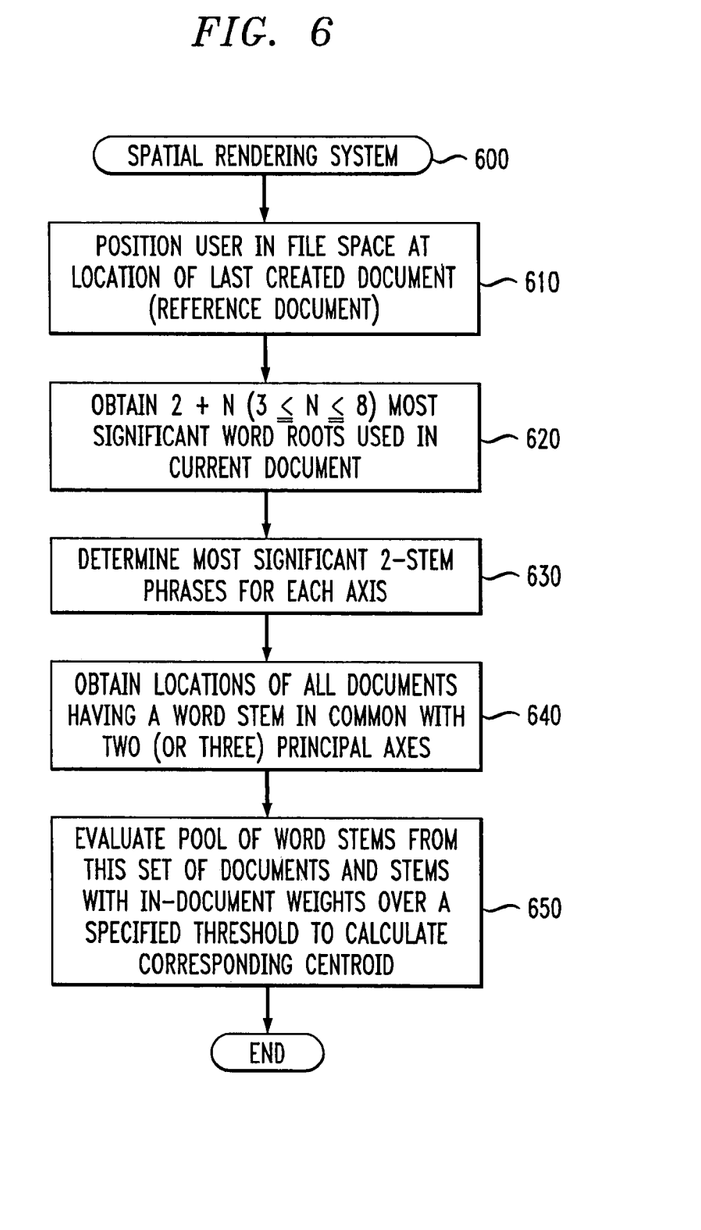
FIG. 6 is a flow chart describing an exemplary implementation of a spatial rendering system of FIG. 1 incorporating features of the present invention.

FIG. 6 is a flow chart describing an exemplary implementation of a spatial rendering system 600 incorporating features of the present invention. The spatial rendering system 600 can be a two or three-dimensional rendering engine for static rendering and file system navigation. The spatial rendering system 600 renders a starfield 700, discussed further below in conjunction with FIG. 7, from the illustrative vantage point of a reference document, having just been browsed or edited. The process of rendering the starfield 700 from a search query is analogous, as would be apparent to a person of ordinary skill in the art. The query terms are treated like a pseudo-document and the same procedure applies. The spatial rendering subsystem 600 can also offer services to the operating system for file saving and access, as well as for searching, in a known manner.

As shown in FIG. 6, the spatial rendering system 600 initially positions the user in the file space at the location of the last created document, during step 610. Thereafter, the spatial rendering system 600 obtains 2+N (where N is roughly a value between 3 and 8) most significant word stems used in the current document during step 620. The first two coordinates serve as the x and y axes, with the N additional coordinates serving as alternate axes (see 730, 740 in FIG. 7 described below).

During step 630, the spatial rendering system 600 determines the most significant 2-stem phrases for each axis. The locations of all documents having a word stem in common with the two (or three) principal axes are then obtained during step 640, using the same term weighting. In one implementation, all documents having a term weighting in the projected space of the principal axes above a specified threshold will be displayed.

Finally, the pool of word stems from this set of documents and the stems with in-document weights (FF-DOC) over a specified threshold are evaluated during step 650 to calculate the corresponding centroid. The centroid serve as landmarks in the file space 700 and are stems which are significantly correlated to the stems representing the principal axes.

FIG. 7 depicts a representative two-dimensional starfield-like snapshot of a user navigating the file space 700. The file space 700 shows localization points, including actual documents and highly correlated single-word stems. In the exemplary notation used in FIG. 7, spherical objects, such as objects 710-714, are documents. Underlined terms, such as terms 720-724, are "landmarks," or terms that are highly correlated to one or both of the principal axes. Objects appearing furthest from the origin 705 have highest correlation to one or both of the principal axes. Object closest to the x-axis are more highly correlated with the stem term "study" (studies, . . . ), and objects closest to the y-axis are more highly correlated with the stem term "music" (musical, . . . ).

Skew axes 730, 740 are alternative orthogonal axes to the two principal axes (x and y). The skew axes 730, 740 may be dragged onto one of the current axes (x and y) to get a new coordinatization, in a manner discussed further below. Drop down menus 751-754 associated with each of the various axes contain significantly occurring two-stem phrases including the principal axis term. Larger spheres, such as the sphere 710, indicate documents having greater total information content (overall document weight calculated during step 440 of FIG. 4). Spheres containing numbers indicate documents that have highest correlation to the user-specified keywords of "music" and "study." In addition, a detail menu 760 provides more detail on these documents having the highest correlation to the user-specified keywords. Finally, a dialog box 770 allows a user to enter a new set of keywords and thereby reposition the location of the file space 700.

In one embodiment, pointing to any spherical object associated with a document, for example, using a mouse or other pointing device reveals the name and size in bytes of the corresponding document. In addition, clicking on any document can open the document. Dragging one of the alternative axes 730, 740 on top of one of the current axes (x and y), replaces the current axis with the new one, resulting in a new display of documents and landmarks. Dragging a landmark on top of an axis replaces the axis with the landmark. It is noted that the resulting axes will not be orthogonal, but, for display purposes the assumption of orthogonality is made (see, for example, Salton & McGill's Vector Space Model). Clicking on a landmark switches to the reference frame of that landmark. The collection of documents containing that landmark, are temporarily viewed as a single document, and principal components calculated, with axes thereby generated, followed by a new rendering of files and landmarks with the new axes.

As noted in the preceding section, drop down menus 751-754 along the various axes contain significantly occurring two-stem phrases, including the principal axis stem. Selecting from a drop down menu amounts to drilling down to greater detail on that axis. Once a two stem phrase is selected, the drop down contains three stem phrases, as well as an option to return to the parent (single stem).

The radio buttons, 705, that allow the user to alter the meaning of size in the rendition are self explanatory. An additional set of radio buttons that allows the user to use light to dark gray-scale shading to indicate either information content, currency or frequency of access (i.e. Size might be used to indicate information content, color to indicate currency) can also be employed. In a further variation, sliders or dials that will allow the user to filter out documents by information content, currency (age), frequency of access, or another quantifiable measure can also be provided. (i.e., users could, by moving the slider/dial, see just very recent or very old documents).

While the present invention has been illustrated in the context of a personal computer system, the invention applies to any device employing file system organization for local or centralized storage media. For example, a user may employ a number of Internet-enabled devices to access the same shared file system, such as a cellular telephone, a personal computer at home and at work, and a personal digital assistant (PDA). Generally, documents created or browsed on one medium should be accessible on all the other media, instantly. For example, a user may desire to utilize his or her cell phone to browse for documents, or previously saved phone conversations that have transcribed to text, for example, using Via Voice™ commercially available from IBM Corporation, using voice commands. Browsing a hierarchy, with 20 to 100 documents in a directory is impractical using a cell phone. Browsing verbally, however, asking the file system for the five closest documents and the five most closely related conceptual landmarks, is more compelling.

In addition, the invention may be applied to store and access documents in a "team room" where there are multiple authors, and it is difficult for the group of authors to jointly assemble a single document hierarchy.

It is to be understood that the embodiments and variations shown and described herein are merely illustrative of the principles of this invention and that various modifications may be implemented by those skilled in the art without departing from the scope and spirit of the invention.

What is claimed is:

1. A method for storing a document in a file system, comprising the steps of:
   determining a term weight for terms appearing in said document, wherein a given term weight is based on a frequency of occurrence of said corresponding term in a reference corpus: and
   storing said document in said file system with an indication of said term weights, wherein said given term weight is obtained by dividing a fractional frequency of said term in said document by a fractional frequency of said term in said reference corpus, wherein said fractional frequency of said term in said document is the number of occurrences of the term in the document divided by the total number of terms in the document and wherein said fractional frequency of said term in said reference corpus is the number of occurrences of the term in the reference corsus divided by the total number of words in the reference corpus.

2. The method of claim 1, further comprising the step of computing an overall document.

3. The method of claim 2, wherein said overall document weight indicates the total information content of a document.

4. The method of claim 2, wherein said overall document weight is the sum of the term weights for all terms in the document.

5. The method of claim 1, wherein said term weights are stored in a relational database.

6. The method of claim 1, wherein said term weights are stored in an inverted index.

7. The method of claim 1, wherein said term weights are stored in an array.

8. The method of claim 1, wherein said term weights are stored in a flat file.

9. The method of claim 1, wherein said document can be coordinatized by said term weights.

10. The method of claim 1, wherein said document can be indexed by said term weights.

11. A method for identifying one or more documents in a file system that are related to one or more specified words, comprising the steps of:
    storing each of said documents in said file system with an indication of a term weight for terms appearing in said corresponding document, wherein a given term weight is based on a frequency of occurrence of said corresponding term in a reference corpus; and
    evaluating a distance between each of said documents and said one or more specified words, wherein said distance is based on said term weights and wherein said given term weight is obtained by dividing a fractional frequency of said term in said document by a fractional frequency of said term in said reference corpus, wherein said fractional frequency of said term in said document is the number of occurrences of the term in the document divided by the total number of terms in the document and wherein said fractional frequency of said term in said reference corpus is the number of occurrences of the term in the reference corpus divided by the total number of words in the reference corpus.

12. The method of claim 11, wherein said distance is the square root of the sum of the squares of the differences between said one or more specified words and terms in said document, using said term weights.

13. A system for storing a document in a file system, comprising:
    a memory that stores computer-readable code; and
    a processor operatively coupled to said memory, said processor configured to implement said computer-readable code, said computer-readable code configured to:
    determine a term weight for terms appearing in said document, wherein a given term weight is based on a frequency of occurrence of said corresponding term in a reference corpus; and
    store said document in said file system with an indication of said term weights, wherein said given term weight is obtained by dividing a fractional frequency of said term in said document by a fractional frequency of said term in said reference corpus, wherein said fractional frequency of said term in said document is the number of occurrences of the term in the document divided by the total number of terms in the document and wherein said fractional frequency of said term in said reference corpus is the number of occurrences of the term in the reference corpus divided by the total number of words in the reference corpus.

14. A system for identifying one or more documents in a file system that are related to one or more specified words, comprising:
    a memory that stores computer-readable code; and
    a processor operatively coupled to said memory, said processor configured to implement said computer-readable code, said computer-readable code configured to:

store each of said documents in said file system with an indication of a term weight for terms appearing in said corresponding document, wherein a given term weight is based on a frequency of occurrence of said corresponding term in a reference corpus; and evaluate a distance between each of said documents and said one or more specified words, wherein said distance is based on said term weights and wherein said given term weight is obtained by dividing a fractional frequency of said term in said document by a fractional frequency of said term in said reference corpus, wherein said fractional frequency of said term in said document is the number of occurrences of the term in the document divided by the total number of terms in the document and wherein said fractional frequency of said term in said reference corpus is the number of occurrences of the term in the reference corpus divided by the total number of words in the reference corpus.

15. An article of manufacture for storing a document in a file system, comprising:

a tangible computer readable recordable storage medium having computer readable code means embodied thereon, said computer readable program code means comprising:

a step to determine a term weight for terms appearing in said document, wherein a given term weight is based on a frequency of occurrence of said corresponding term in a reference corpus; and a step to store said document in said file system with an indication of said term weights, wherein said oven term weight is obtained by dividing a fractional frequency of said term in said document by a fractional frequency of said term in said reference corpus, wherein said fractional frequency of said term in said document is the number of occurrences of the term in the document divided by the total number of terms in the document and wherein said fractional frequency of said term in said reference corpus is the number of occurrences of the term in the reference corpus divided by the total number of words in the reference corpus.

16. An article of manufacture for identifying one or more documents in a file system that are related to one or more specified words, comprising:

a tangible computer readable recordable storage medium having computer readable code means embodied thereon, said computer readable program code means comprising:

a step to store each of said documents in said file system with an indication of a term weight for terms appearing in said corresponding document, wherein a given term weight is based on a frequency of occurrence of said corresponding term in a reference corpus; and a step to evaluate a distance between each of said documents and said one or more specified words, wherein said distance is based on said term weights and wherein said given term weight is obtained by dividing a fractional frequency of said term in said document by a fractional frequency of said term in said reference corpus, wherein said fractional frequency of said term in said document is the number of occurrences of the term in the document divided by the total number of terms in the document and wherein said fractional frequency of said term in said reference corpus is the number of occurrences of the term in the reference corpus divided by the total number of words in the reference corpus.

* * * * *